(12) United States Patent
Tracy et al.

(10) Patent No.: US 12,423,234 B1
(45) Date of Patent: Sep. 23, 2025

(54) CACHE GOVERNANCE IN A COMPUTING ENVIRONMENT WITH MULTIPLE PROCESSORS

(71) Applicant: International Business Machines Corporation, Armonk, NY (US)

(72) Inventors: Guy G. Tracy, Austin, TX (US); Jason D. Kohl, Austin, TX (US); Gregory William Alexander, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/780,623

(22) Filed: Jul. 23, 2024

(51) Int. Cl.
*G06F 12/0806* (2016.01)
(52) U.S. Cl.
CPC ...... *G06F 12/0806* (2013.01); *G06F 2212/62* (2013.01)
(58) Field of Classification Search
CPC ............. G06F 2212/62; G06F 12/0806; G06F 12/084; G06F 12/0846; G06F 9/3851; G06F 2209/543
USPC .......................................... 711/119, 118, 130
See application file for complete search history.

(56) References Cited

U.S. PATENT DOCUMENTS

| | | | |
|---|---|---|---|
| 10,310,982 B2 | 6/2019 | Berger et al. | |
| 10,440,096 B2 | 10/2019 | Sabella et al. | |
| 10,802,966 B2 | 10/2020 | Iyengar et al. | |
| 11,010,210 B2 | 5/2021 | Sonnelitter, III et al. | |
| 11,050,813 B2 | 6/2021 | Sabella et al. | |
| 11,159,408 B2 | 10/2021 | Svennebring et al. | |
| 11,244,242 B2 | 2/2022 | Prakash et al. | |
| 11,270,201 B2 | 3/2022 | Sridharan et al. | |
| 11,347,644 B2 | 5/2022 | Chirca et al. | |
| 11,382,071 B2 | 7/2022 | Mueck et al. | |
| 11,423,254 B2 | 8/2022 | Prakash et al. | |
| 11,695,821 B2 | 7/2023 | Sabella et al. | |
| 11,704,565 B2 | 7/2023 | Sridharan et al. | |
| 11,711,284 B2 | 7/2023 | Svennebring et al. | |
| 11,729,440 B2 | 8/2023 | Butler et al. | |

(Continued)

OTHER PUBLICATIONS

Anonoymous, Accelerated Performance With Next-Generation Cache Assist, IP.com, IPCOM000266789D, Aug. 19, 2021, 4 pages.

(Continued)

*Primary Examiner* — Hashem Farrokh
(74) *Attorney, Agent, or Firm* — CANTOR COLBURN LLP; Edward Wixted

(57) ABSTRACT

A computer-implemented method for cache governance includes receiving, at a local cache of a processor chip, a first fetch request for data for a cache line of the local cache. The method further includes allocating a first cache controller to allow the first fetch request to receive the data and to track reception of the data. The method further includes receiving, at the local cache of the processor chip, a second fetch request for the data for the cache line of the local cache. The method further includes determining via an address compare logic associated with the local cache whether the first fetch request in the first cache controller is for a same cache line that the second fetch request is targeting. The method further includes allowing the second fetch request to allocate a second cache controller and copying metadata from the first cache controller to the second cache controller.

20 Claims, 4 Drawing Sheets

(56) References Cited

U.S. PATENT DOCUMENTS

| | | | |
|---|---|---|---|
| 11,791,871 B2 | 10/2023 | Banuli Nanje Gowda | |
| 11,791,938 B2 | 10/2023 | Podlozhnyuk et al. | |
| 11,838,126 B2 | 12/2023 | Papadopoulou et al. | |
| 11,853,212 B2 | 12/2023 | Nguyen et al. | |
| 11,863,328 B2 | 1/2024 | Zhu et al. | |
| 11,863,844 B2 | 1/2024 | Iyer et al. | |
| 11,868,259 B2 | 1/2024 | Papazova et al. | |
| 12,038,841 B2 | 7/2024 | Nguyen et al. | |
| 2009/0164739 A1* | 6/2009 | Harikumar | G06F 9/542 |
| | | | 711/E12.001 |
| 2014/0032845 A1* | 1/2014 | Avudaiyappan | G06F 12/0897 |
| | | | 711/E12.024 |
| 2022/0283942 A1 | 9/2022 | Chirca et al. | |
| 2023/0289299 A1* | 9/2023 | Zmora | G06F 12/0895 |

OTHER PUBLICATIONS

Anonoymous, Fairness Circuit for Atomic Read-Modify-Write Operations on Multi-Processor Systems, IP.com, IPCOM000256121D, Nov. 6, 2018, 5 pages.

Anonoymous, Method for Dyanamic Multi-Hit Avoidance in a Pipelined Memory Management Unit (MMU) While Writing to an Effective to Real Address Translation (ERAT) Cache Structure, IP.com, IPCOM000268005D, Dec. 15, 2021, 5 pages.

Hsieh, et al, "Handoff optimization in 802.11 wireless networks", EURASIP Journal on Wireless Communications and Networking, 2011, 16 pages.

Madaan, et al, "Vertical Handoff Decision Stategies in Heterogeneous Wireless Networks", Communications on Applied Electronics (CAE), 2015, 8 pages.

Singh, et al, "Identification of Suitable Conditions for Handoff in Real Time Mobile Network Technologies", Communications on Applied Electronics (CAE), 2017, 11 pages.

* cited by examiner

CACHE GOVERNANCE IN A COMPUTING ENVIRONMENT WITH MULTIPLE PROCESSORS

BACKGROUND

The present disclosure relates to computing environments, and more specifically, to cache governance in a computing environment with multiple processors (also referred to as "processor chips").

In computing environments that have multiple processor chips on the same drawers and/or processor chips in other drawers sharing one or more caches, those processor chips may have access to the same cache lines. Where a processor chip has multiple processing threads, the processing threads may also have access to the same cache lines. A cache line or line is a portion of data of a specific size (e.g., 256 bytes), which fits into a single cache entry in a cache. Coherency is managed on a cache line granularity as data is transferred between memory and a cache. To provide coherency of a cache line, snoop requests (also referred as "snoops" or "fetch requests") are used. Snoop requests are processed by receiving a snoop request from a requesting cache, determining if the cache has a copy of the cache line in an appropriate state, sending the cache line to the requesting cache, and updating the state of the cache line in the cache.

A cache structure and its related services provide processor chips with data consistency of their shared data. Many processor chips on the same drawer and/or processor chips on different drawers may attempt to access the same cache line. Similarly, multiple processing threads of a single processor chip may attempt to access the same cache line.

SUMMARY

According to an embodiment, a computer-implemented method for cache governance is provided. The method includes receiving, at a local cache of a processor chip, a first fetch request from a local requestor for data for a cache line of the local cache. The method further includes allocating a first cache controller to allow the first fetch request to receive the data for the cache line and to track reception of the data for the cache line. The method further includes receiving, at the local cache of the processor chip, a second fetch request for the data for the cache line of the local cache. The method further includes, in response to receiving the second fetch request and in response to the first cache controller being in a state of sufficient authority to return a copy of the cache line to the local requestor, determining via an address compare logic associated with the local cache whether the first fetch request in the first cache controller is for a same cache line that the second fetch request is targeting. The method further includes, in response to determining that the first fetch request in the first cache controller is for the same cache line that the second fetch request is targeting and in response to determining that servicing the second fetch request cannot be resolved locally, allowing the second fetch request to allocate a second cache controller. The method further includes copying metadata from the first cache controller to the second cache controller.

According to another embodiment, embodiment a processor chip is provided. The processor chip includes a bus and a cache connected to the bus. The cache includes a local cache and cache governance logic governs external access to the local cache from one or more other components connected to the bus, wherein the cache governance logic performs operations. The operations include receiving, at the local cache of the processor chip, a first fetch request from a local requestor for data for a cache line of the local cache, the local requestor being one of the one or more other components connected to the bus. The operations further include allocating a first cache controller to allow the first fetch request to receive the data for the cache line and to track reception of the data for the cache line. The operations further include receiving, at the local cache of the processor chip, a second fetch request for the data for the cache line of the local cache. The operations further include, in response to receiving the second fetch request and in response to the first cache controller being in a state of sufficient authority to return a copy of the cache line to the local requestor, determining via an address compare logic associated with the local cache whether the first fetch request in the first cache controller is for a same cache line that the second fetch request is targeting. The operations further include, in response to determining that the first fetch request in the first cache controller is for the same cache line that the second fetch request is targeting and in response to determining that servicing the second fetch request cannot be resolved locally, allowing the second fetch request to allocate a second cache controller. The operations further include copying metadata from the first cache controller to the second cache controller.

According to yet another embodiment, a system is provided. The system includes a bus and a cache connected to the bus, the cache having a local cache. The system further includes a memory having computer readable instructions. The system further includes a processing device for executing the computer readable instructions, the computer readable instructions controlling the processing device to perform operations for governing external access to the local cache from one or more other components connected to the bus. The operations include receiving, at the local cache, a first fetch request from a local requestor for data for a cache line of the local cache, the local requestor being one of the one or more other components connected to the bus. The operations further include allocating a first cache controller to allow the first fetch request to receive the data for the cache line and to track reception of the data for the cache line. The operations further include receiving, at the local cache, a second fetch request for the data for the cache line of the local cache. The operations further include, in response to receiving the second fetch request and in response to the first cache controller being in a state of sufficient authority to return a copy of the cache line to the local requestor, determining via an address compare logic associated with the local cache whether the first fetch request in the first cache controller is for a same cache line that the second fetch request is targeting. The operations further include, in response to determining that the first fetch request in the first cache controller is for the same cache line that the second fetch request is targeting and in response to determining that servicing the second fetch request cannot be resolved locally, allowing the second fetch request to allocate a second cache controller. The operations further include copying metadata from the first cache controller to the second cache controller.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of one or more embodiments described herein are apparent from the following detailed description taken in conjunction with the accompanying drawings in which:

Figure 1:
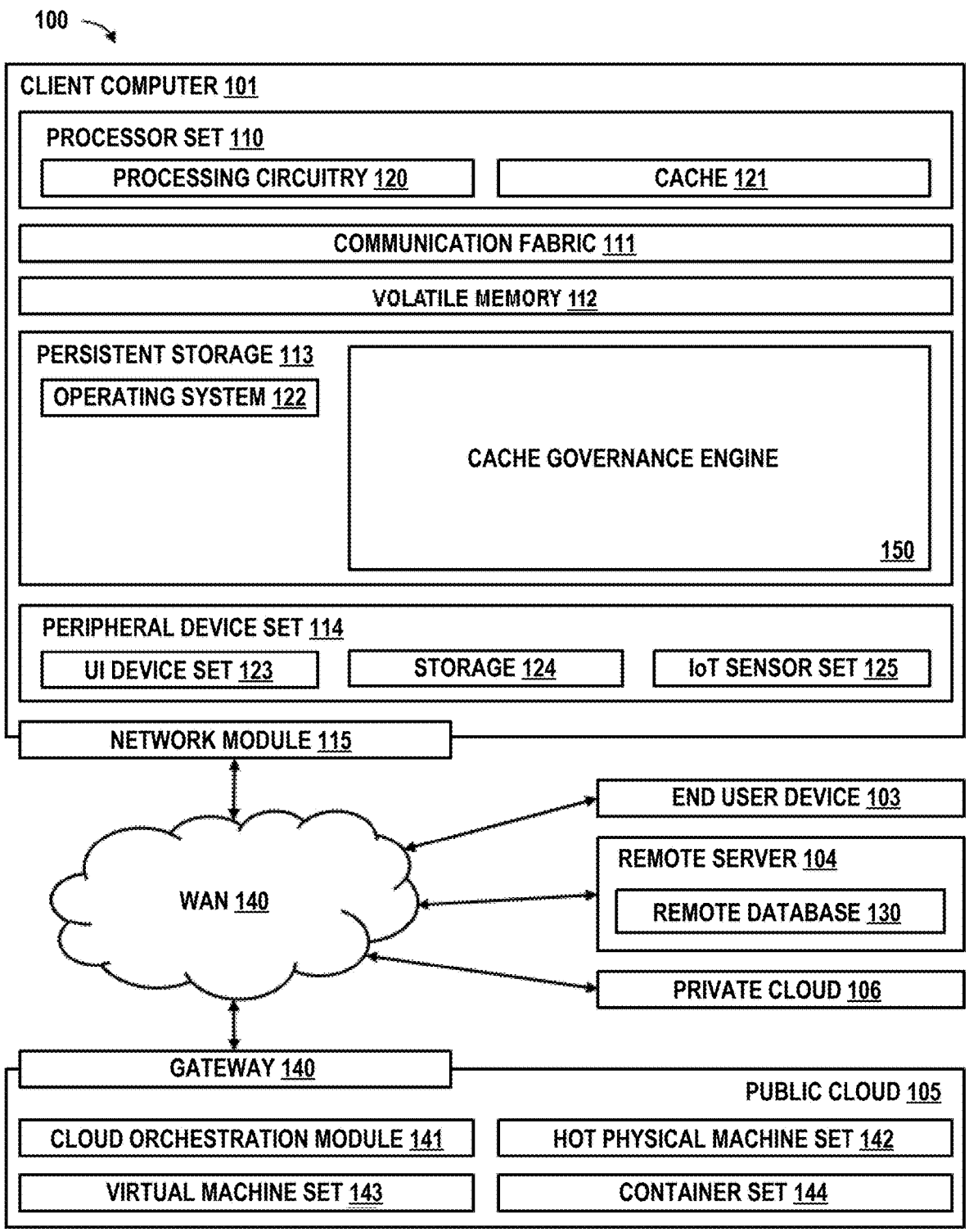
FIG. 1 illustrates a computing environment, according to an embodiment.

The detailed description explains embodiments of the disclosure, together with advantages and features, by way of example with reference to the drawings.

DETAILED DESCRIPTION

One or more embodiments described herein provide for cache governance in a computing environment with multiple processors. An example of such a computing environment is a z/Architecture-based computing environment, although other types of computing environments are contemplated and within the scope of the present disclosure.

According to an embodiment, a computer-implemented method for cache governance is provided. The method includes receiving, at a local cache of a processor chip, a first fetch request from a local requestor for data for a cache line of the local cache. The method further includes allocating a first cache controller to allow the first fetch request to receive the data for the cache line and to track reception of the data for the cache line. The method further includes receiving, at the local cache of the processor chip, a second fetch request for the data for the cache line of the local cache. The method further includes, in response to receiving the second fetch request and in response to the first cache controller being in a state of sufficient authority to return a copy of the cache line to the local requestor, determining via an address compare logic associated with the local cache whether the first fetch request in the first cache controller is for a same cache line that the second fetch request is targeting. The method further includes, in response to determining that the first fetch request in the first cache controller is for the same cache line that the second fetch request is targeting and in response to determining that servicing the second fetch request cannot be resolved locally, allowing the second fetch request to allocate a second cache controller. The method further includes copying metadata from the first cache controller to the second cache controller.

A method according to one or more embodiments provides for an increase in fairness and responsiveness performance during high address contention workloads, thereby improving the functioning of the computing environment implementing the method.

In addition to one or more of the features described herein, or as an alternative, further embodiments of the method may include that the first fetch request is a read-only request. Such a method provides for an increase in fairness and responsiveness performance during high address contention workloads, thereby improving the functioning of the computing environment implementing the method.

In addition to one or more of the features described herein, or as an alternative, further embodiments of the method may include that the second fetch request is an exclusive fetch request. Such a method provides for accommodating the exclusive request without significant delay.

In addition to one or more of the features described herein, or as an alternative, further embodiments of the method may include that the cache governance provides hotline fairness. Such a method provides for an increase in fairness and responsiveness performance during high address contention workloads, thereby improving the functioning of the computing environment implementing the method.

In addition to one or more of the features described herein, or as an alternative, further embodiments of the method may include that, as part of allowing the second fetch request to allocate the second cache controller, the address compare logic generates a copy of hotline fairness vectors from the first cache controller and stores the copy in the second cache controller. Such a method provides for an increase in fairness and responsiveness performance during high address contention workloads, thereby improving the functioning of the computing environment implementing the method.

In addition to one or more of the features described herein, or as an alternative, further embodiments of the method may include that the second cache controller sets pending and protects the cache line, and wherein, in response to determining that the first fetch request in the first cache controller is for a same cache line that the second fetch request is targeting and in response to determining that servicing the second fetch request cannot be resolved locally, the first cache controller retires and ceases to protect the cache line. Such a method provides for an increase in fairness and responsiveness performance during high address contention workloads, thereby improving the functioning of the computing environment implementing the method.

In addition to one or more of the features described herein, or as an alternative, further embodiments of the method may include that the second fetch request is sent from one or more other components selected from a group consisting of a processor core of the processor chip, an accelerator, and an input/output device. Such a method provides for an increase in fairness and responsiveness performance during high address contention workloads, thereby improving the functioning of the computing environment implementing the method.

In addition to one or more of the features described herein, or as an alternative, further embodiments of the method may include that the first fetch request is sent from a first core of the processor chip, and the second fetch request is sent from a second core of the processor chip. Such a method provides for an increase in fairness and responsiveness performance during high address contention workloads, thereby improving the functioning of the computing environment implementing the method.

In addition to one or more of the features described herein, or as an alternative, further embodiments of the method may include that the first cache controller provides read only access of the cache line to the local requestor. Such a method provides for an increase in fairness and responsiveness performance during high address contention workloads, thereby improving the functioning of the computing environment implementing the method.

According to another embodiment, embodiment a processor chip is provided. The processor chip includes a bus and a cache connected to the bus. The cache includes a local cache and cache governance logic governs external access to the local cache from one or more other components connected to the bus, wherein the cache governance logic performs operations. The operations include receiving, at the local cache of the processor chip, a first fetch request from a local requestor for data for a cache line of the local cache, the local requestor being one of the one or more other components connected to the bus. The operations further include allocating a first cache controller to allow the first fetch request to receive the data for the cache line and to track reception of the data for the cache line. The operations further include receiving, at the local cache of the processor chip, a second fetch request for the data for the cache line of the local cache. The operations further include, in response to receiving the second fetch request and in response to the first cache controller being in a state of sufficient authority to return a copy of the cache line to the local requestor, determining via an address compare logic associated with the local cache whether the first fetch request in the first cache controller is for a same cache line that the second fetch request is targeting. The operations further include, in response to determining that the first fetch request in the first cache controller is for the same cache line that the second fetch request is targeting and in response to determining that servicing the second fetch request cannot be resolved locally, allowing the second fetch request to allocate a second cache controller. The operations further include copying metadata from the first cache controller to the second cache controller.

A processor chip according to one or more embodiments provides for an increase in fairness and responsiveness performance during high address contention workloads, thereby improving the functioning of the processor chip implementing the operations.

In addition to one or more of the features described herein, or as an alternative, further embodiments of the processor chip may include that the first fetch request is a read-only request. Such operations provide for an increase in fairness and responsiveness performance during high address contention workloads, thereby improving the functioning of the processor chip implementing the operations.

In addition to one or more of the features described herein, or as an alternative, further embodiments of the processor chip may include that the second fetch request is an exclusive fetch request. Such operations provide for accommodating the exclusive request without significant delay.

In addition to one or more of the features described herein, or as an alternative, further embodiments of the processor chip may include that the cache governance provides hotline fairness. Such operations provide for an increase in fairness and responsiveness performance during high address contention workloads, thereby improving the functioning of the processor chip implementing the operations.

In addition to one or more of the features described herein, or as an alternative, further embodiments of the processor chip may include that, as part of allowing the second fetch request to allocate the second cache controller, the address compare logic generates a copy of hotline fairness vectors from the first cache controller and stores the copy in the second cache controller. Such operations provide for an increase in fairness and responsiveness performance during high address contention workloads, thereby improving the functioning of the processor chip implementing the operations.

In addition to one or more of the features described herein, or as an alternative, further embodiments of the processor chip may include that the second cache controller sets pending and protects the cache line, and wherein, in response to determining that the first fetch request in the first cache controller is for a same cache line that the second fetch request is targeting and in response to determining that servicing the second fetch request cannot be resolved locally, the first cache controller retires and ceases to protect the cache line. Such operations provide for an increase in fairness and responsiveness performance during high address contention workloads, thereby improving the functioning of the processor chip implementing the operations.

In addition to one or more of the features described herein, or as an alternative, further embodiments of the processor chip may include that the second fetch request is sent from one or more other components selected from a group consisting of a processor core of the processor chip, an accelerator, and an input/output device. Such operations provide for an increase in fairness and responsiveness performance during high address contention workloads, thereby improving the functioning of the processor chip implementing the operations.

In addition to one or more of the features described herein, or as an alternative, further embodiments of the processor chip may include that the first fetch request is sent from a first core of the processor chip, and the second fetch request is sent from a second core of the processor chip. Such operations provide for an increase in fairness and responsiveness performance during high address contention workloads, thereby improving the functioning of the processor chip implementing the operations.

In addition to one or more of the features described herein, or as an alternative, further embodiments of the processor chip may include that the first cache controller provides read only access of the cache line to the local requestor. Such operations provide for an increase in fairness and responsiveness performance during high address contention workloads, thereby improving the functioning of the processor chip implementing the operations.

According to yet another embodiment, a system is provided. The system includes a bus and a cache connected to the bus, the cache having a local cache. The system further includes a memory having computer readable instructions. The system further includes a processing device for executing the computer readable instructions, the computer readable instructions controlling the processing device to perform operations for governing external access to the local cache from one or more other components connected to the bus. The operations include receiving, at the local cache, a first fetch request from a local requestor for data for a cache line of the local cache, the local requestor being one of the one or more other components connected to the bus. The operations further include allocating a first cache controller to allow the first fetch request to receive the data for the cache line and to track reception of the data for the cache line. The operations further include receiving, at the local cache, a second fetch request for the data for the cache line of the local cache. The operations further include, in response to receiving the second fetch request and in response to the first cache controller being in a state of sufficient authority to return a copy of the cache line to the local requestor, determining via an address compare logic associated with the local cache whether the first fetch request in the first cache controller is for a same cache line that the second fetch request is targeting. The operations further include, in response to determining that the first fetch request in the first cache controller is for the same cache line that the second fetch request is targeting and in response to determining that servicing the second fetch request cannot be resolved locally, allowing the second fetch request to allocate a second cache controller. The operations further include copying metadata from the first cache controller to the second cache controller.

A system according to one or more embodiments provides for an increase in fairness and responsiveness performance during high address contention workloads, thereby improving the functioning of the system implementing the operations.

In addition to one or more of the features described herein, or as an alternative, further embodiments of the system may include that the first fetch request is a read-only request and the second fetch request is an exclusive fetch request. Such operations provide for an increase in fairness and responsiveness performance during high address contention workloads, thereby improving the functioning of the processor chip implementing the operations. Further, such operations provide for accommodating the exclusive request without significant delay.

Descriptions of various embodiments of the present disclosure are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100, according to an embodiment. Computing environment 100 contains an example of an environment for the execution of at least some of the computer code involved in performing the inventive methods, such as a cache governance engine 150 for performing cache governance in a computing environment with multiple processors. In addition to cache governance engine 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and cache governance engine 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in cache governance engine 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in cache governance engine 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
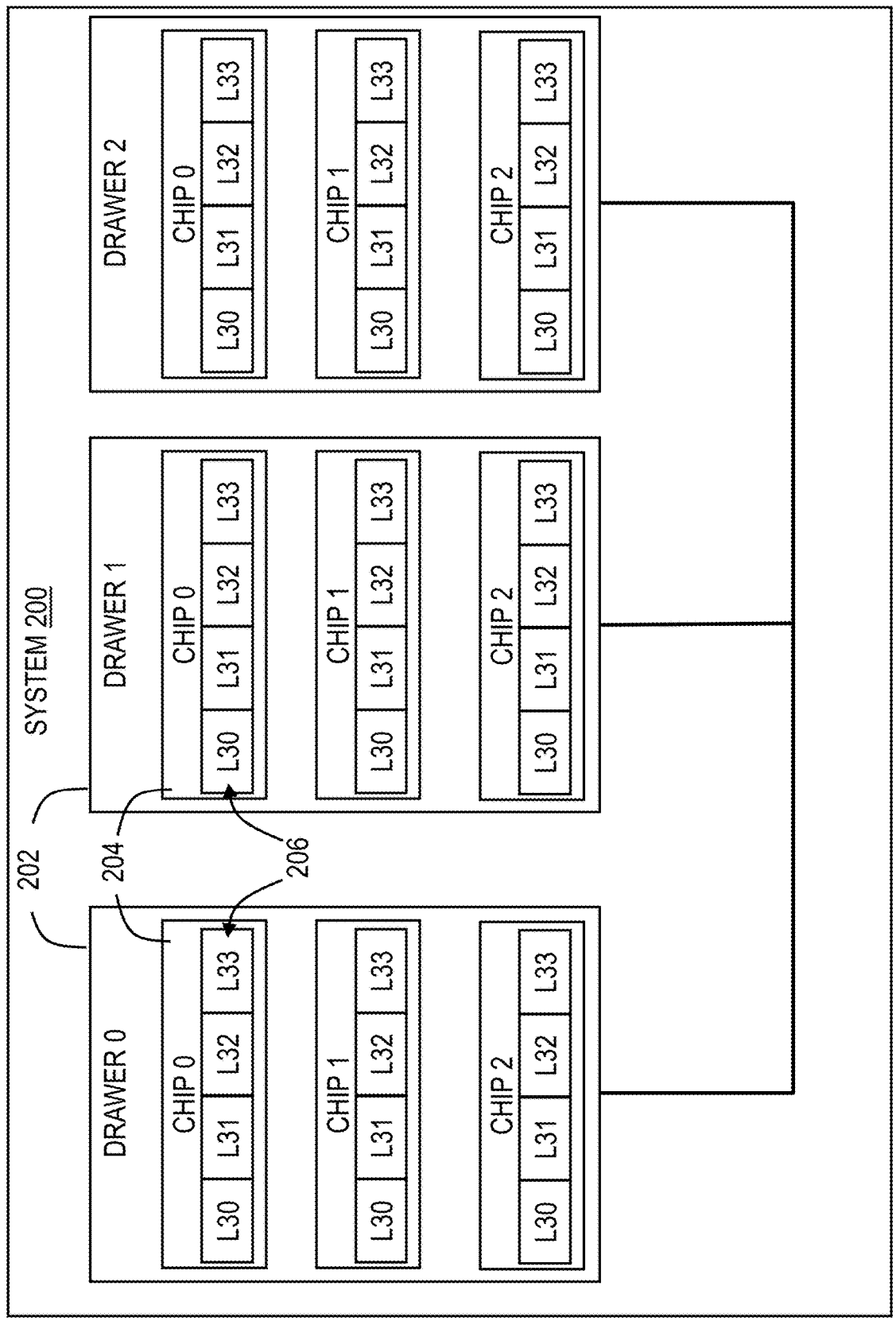
FIG. 2 depicts a block diagram of an example system configured to provide cache governance, according to an embodiment.
Figure 3:
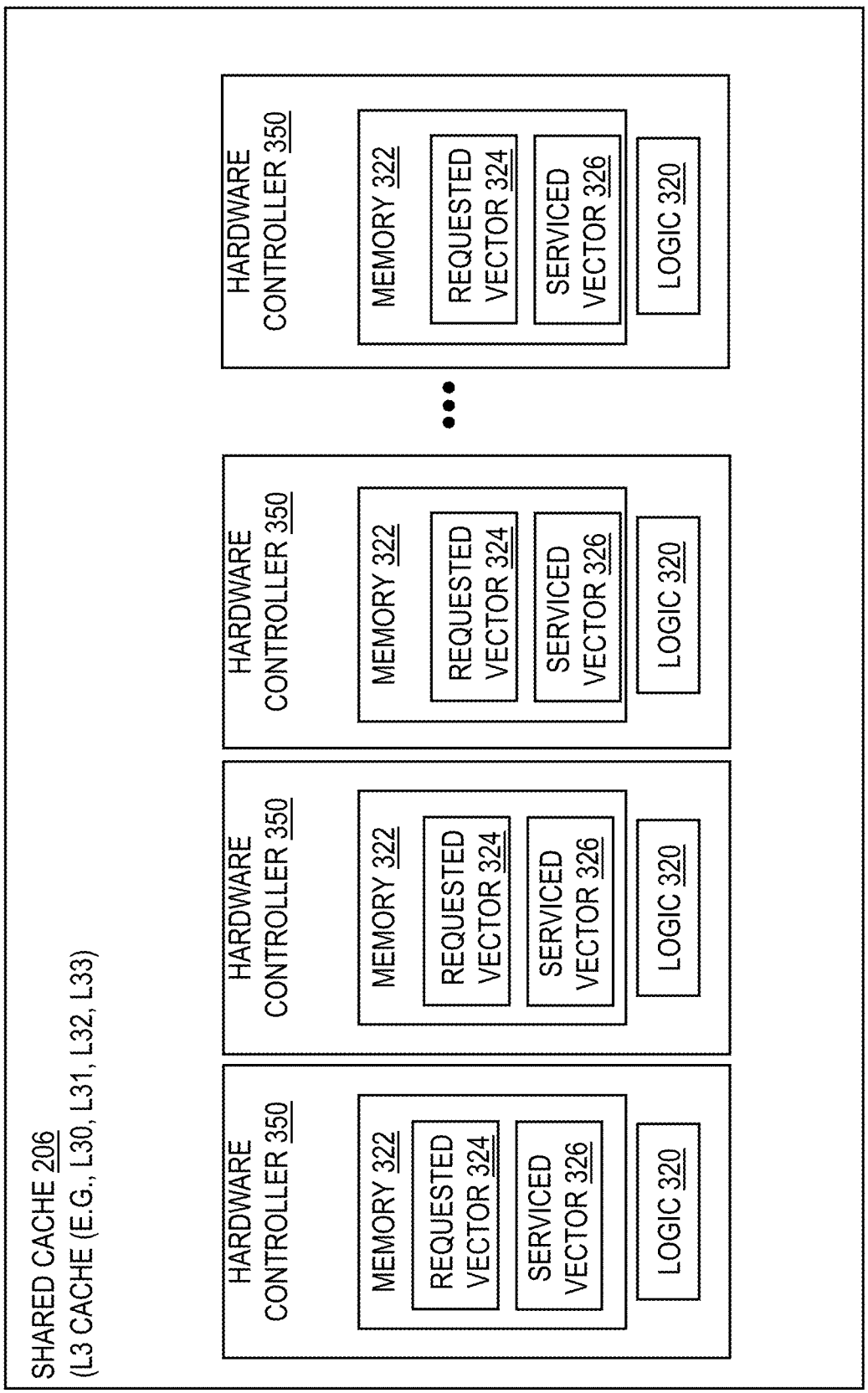
FIG. 3 depicts a block diagram of an example shared cache configured to provide cache governance, according to an embodiment.

FIG. 2 depicts a block diagram of an example system 200 configured to provide cache governance according to one or more embodiments. In system 200, there can be many interconnected drawers 202, such as drawer 0, drawer 1, and drawer 2. Each of the drawers 202 includes processor chips 204, such as processor chip 0, processor chip 1, and processor chip 2. Each processor chip 204 is coupled to and/or includes shared caches 206 (e.g., level three (L3) caches), such as L30, L31, L32, and L33. Further details of an example shared cache 206 is depicted in FIG. 3. Computing environment 100 may be integrated with and/or use processor chips 204 in FIG. 2. Many computing environments 100 and/or features of computing environment 100 may be integrated in system 200. The system 200 may be representative of one or more portions of a cloud computing environment, for example. One or more of the processing set 110 may represent processor chips 204. The processor chips 204 can include processing circuitry (e.g., processing circuitry 120) and shared caches 206 (e.g., cache 121). Although not shown for conciseness, the processor chips 204 can include higher-level caches, such as L2 caches and L1 caches, where the L1 cache is closest to the processor core as understood by one of ordinary skill in the art. According to one or more embodiments, the processor chips 204 can include multiple processing threads for performing parallel processing.

FIG. 3 depicts a block diagram of an example shared cache 206 (e.g., L30, L31, L32, L33) configured to provide cache governance according to one or more embodiments. Although details of a single shared cache 206 are illustrated in FIG. 3, the discussion applies by analogy to the other shared caches 206. Shared cache 206 can include and/or be coupled to various hardware controllers 350 in which the hardware controllers 350 are configured to control access to cache lines on the shared cache 206 such as for reading or writing, to send requests to access other cache lines on other shared caches 206, and to implement a requested vector and serviced vector per cache line according to one or more embodiments. According to one or more embodiments, each hardware controller 350 includes logic 320 configured to provide cache governance using a requested vector 324 and serviced vector 326, for example. The logic 320 may be or include the cache governance engine 150, according to one or more embodiments. According to one or more embodiments, a hardware controller 350 may include the requested vector 324 and serviced vector 326 for a single cache line in memory 322, and the requested vector 324 and serviced vector 326 for the cache line are passed along as metadata to the next hardware controller 350 along with the data in the cache line. In such an embodiment, each cache line in a shared cache 206 has its own requested vector 324 and serviced vector 326, which are maintained and passed throughout the system 200 according to one or more embodiments. This process is referred to as completing HLF. It should be appreciated that the embodiments described herein can be applied to any metadata and are not limited to completing HLF. Rather, completing HLF using the requested vector 324 and the serviced vector 326 are merely described to provide an example.

Hardware controllers 350 can include the functionality of one or more known hardware controllers. Hardware controllers 350 can be and/or include functionality of local fetch address register controllers (LFARs), core store address register controllers (CSARs), core cache fetch controllers (CFARs), remote fetch controllers (RFARs), local store address register controllers (LSARs), remote store address controller (RSAR), and other hardware controllers understood by one of ordinary skill in the art. Logic 320 (e.g., the cache governance engine 150) can include logic circuitry, firmware executable by circuits on hardware controller 350, and/or a combination of logic circuitry and firmware. Moreover, logic 320 can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, logic 320 described herein can be a combination of hardware and programming. The programming can be processor executable instructions stored on a tangible memory, and the hardware can include processing circuitry for executing those instructions. Alternatively or additionally, logic 320 can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. Logic 320 of hardware controllers 350 of the shared caches are configured to provide cache governance. Cache governance involves increasing fairness and responsiveness performance during high address contention workloads.

In some situations, the requested vector 324 tracks requests made by other devices (e.g., other processing cores, other processor chips 204, and/or the like, including combinations and/or multiples thereof) and tracks which devices have made requests from where and which have been serviced from where. This provides for each requestor to peek at the cache line before any core/device is given a second opportunity to view or access the cache line. However, in such situations, this can cause delays when an exclusive fetch request follows a read-only request. For example, if a first request from a requestor (e.g., a first processing core) is for a read-only copy of a cache line and a second request from another requestor (e.g., a different processing core) is for an exclusive copy of the line, a lengthy delay occurs. This is because the first request marked that device as serviced; therefore, the second request (e.g., the exclusive request) is deprioritized until other cores/devices/threads have an opportunity to read the cache line.

For example, a CFAR (e.g. the hardware controller 350) may load under a long running hotline fairness (HLF) LFAR if and only if the cacheline was installed in an exclusive state in a cache directory. A non-exclusive state LFAR active with HLF blocks further core fetches for the same cache line from receiving data until the HLF LFAR retires. One thread receiving data can effectively block the other thread from accessing the data until the cache line travels around the system and completes HLF. The exclusive state exception has been carved out to allow either thread under an L3 cache to release a lock with a fetch exclusive while HLF is active.

Consider the following scenario. Thread 0 fetch exclusive loads a CFAR resource in a wait state waiting for non-exclusive state thread 1 HLF LFAR with core pending active to complete before the CFAR may proceed. HLF LFAR has off-drawer/chip HLF vector request bits set and must wait for an off-drawer snoop to return before handing off the cache line and going invalid. HLF handoff to remote requestor occurs and RFAR may invalidate the cache line. Thread 0 fetch exclusive will then need to load LFAR and go off-drawer/chip to acquire data and exclusivity. In this case, the fetch exclusive cannot participate any mechanisms for distributing multiple copies which could have sped up the completion of HLF. Because off-drawer HLF request bits are set, the line travels to another drawer before HLF can complete and therefore before the exclusive fetch of thread 0 can receive data. In a large system, this can cause extensive delay.

One or more embodiments address these and other shortcomings by providing a technique whereby, once a read-only request has finished and there is an upcoming exclusive request, the exclusive request is accommodated without significant delay. This is accomplished by providing for a second LFAR to load while a first LFAR still persists but the first LFAR performs a handoff during a small, controlled window (e.g., a few cycles). As a result, an increase in fairness and responsiveness performance during high address contention workloads is realized, thereby improving the functioning of the computing environment 100.

According to an embodiment, the core pending on HLF active is dropped for non-exclusive state LFARs. CFARs processing read-only fetches are allowed to be loaded and complete under active HLF LFAR instead of waiting with needs. CFARs loading under long running HLF LFARs allow both threads under an L3 cache to "double dip" with read-only fetches, improving responsiveness during high address contention workloads and decreasing delays. Both CFAR and LFAR are active on the same address.

According to one or more embodiments, a core fetch exclusive may load a new LFAR on top of an already active HLF LFAR for the same line address. HLF vectors are copied from the old HLF LFAR to the new LFAR. Newly loaded LFAR sets pendings and protects the line normally. The old HLF LFAR retires and ceases to protect the cache line.

Figure 4:
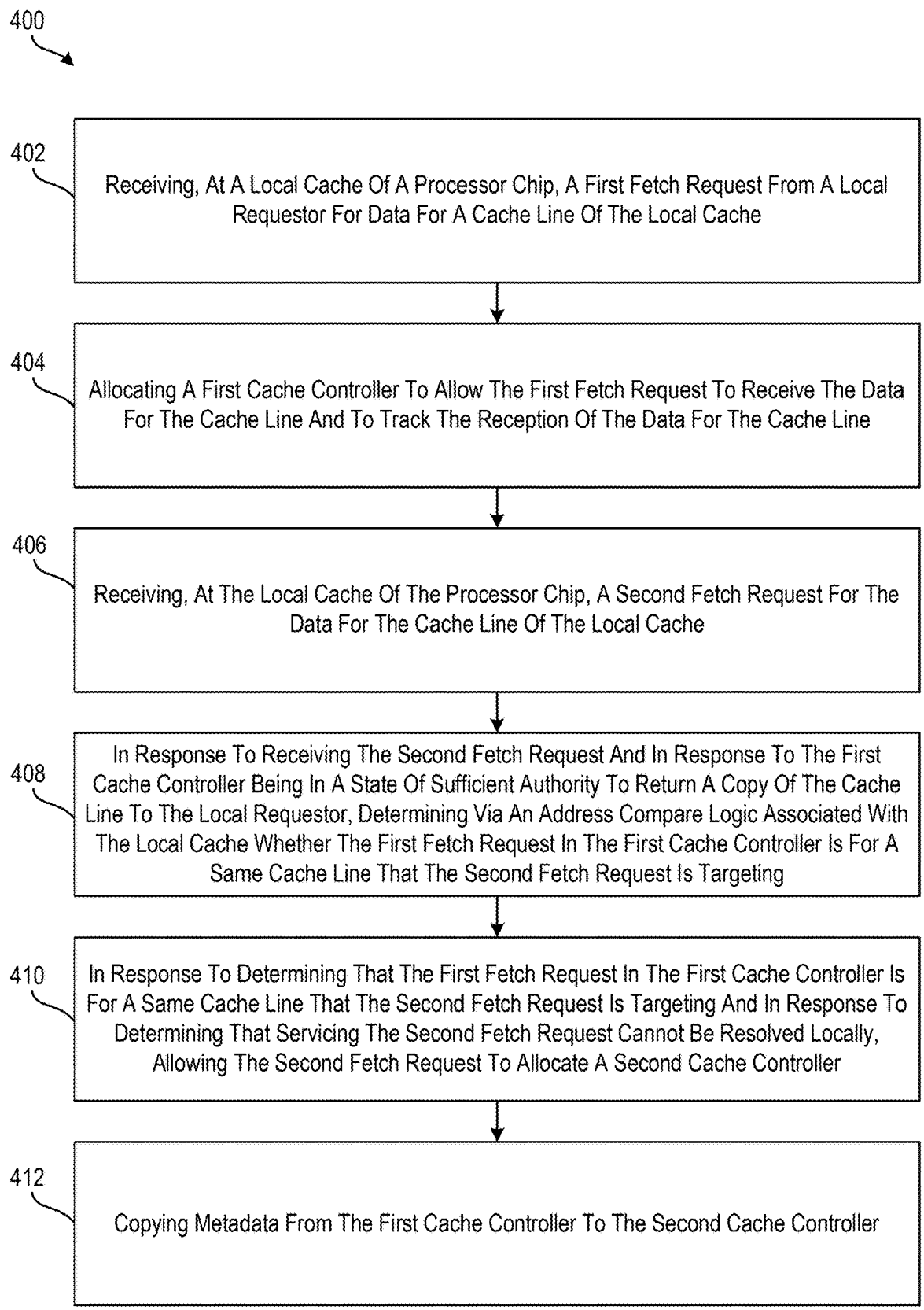
FIG. 4 illustrates a flow diagram of a method for providing cache governance, according to an embodiment.

FIG. 4 illustrates a flow diagram of a method 400 for cache governance, according to an embodiment. For example, the cache governance can provide hotline fairness. The method 400 can be performed by any suitable computing system, device, or environment, such as those described herein. The method 400 is now described with reference to the computing environment 100 of FIG. 1 and the system 200 of FIG. 2 (including the cache 206 shown in FIG. 3) but is not so limited.

At block 402 a local cache (e.g., shared cache 206) of a processor chip (e.g., processor chip 204) receives a first fetch request from a local requestor (e.g., a first core of the processor chip 204) for data for a cache line of the local cache. According to one or more embodiments, first fetch request is a read-only request.

At block 404, a first cache controller (e.g., hardware controller 350) is allocated to allow the first fetch request to receive the data for the cache line and to track the reception of the data for the cache line. According to one or more embodiments, the first cache controller provides read only access of the cache line to the local requestor.

At block 406, the local cache of the processor chip receives a second fetch request for the data for the cache line of the local cache. According to one or more embodiments, second fetch request is an exclusive fetch request. According to one or more embodiments, the second fetch request can be sent by a device connected to the local cache (e.g., the shared cache 206), such as by a bus. For example, where the local requestor is a first core of the processor chip 204, the second fetch request can originate from a second core of the processor chip 204. As another example, the first and second fetch requests can be from other devices or components connected to the bus other than cores (e.g., other processor chips). According to one or more embodiments, the second fetch request is sent from one or more other components selected from a group consisting of a processor core of the processor chip, an accelerator, and an input/output device.

At block 408, in response to receiving the second fetch request and in response to the first cache controller being in a state of sufficient authority to return a copy of the cache line to the local requestor, an address compare logic associated with the local cache (e.g., the logic 320 and/or the cache governance engine 150) determines whether the first fetch request in the first cache controller is for a same cache line that the second fetch request is targeting. That is, it is determined whether the first and second fetch requests are targeting the same cache line.

At block 410, in response to determining that the first fetch request in the first cache controller is for a same cache line that the second fetch request is targeting and in response to determining that servicing the second fetch request cannot be resolved locally, the second fetch request is allowed to allocate a second cache controller (e.g., another of the hardware controller 350). According to one or more embodiments, as part of allowing the second fetch request to allocate the second cache controller, the address compare logic (e.g., the logic 320) generates a copy of hotline fairness vectors from the first cache controller and stores the copy in the second cache controller. According to one or more embodiments, the second cache controller sets pending and protects the cache line, and, in response to determining that the first fetch request in the first cache controller is for a same cache line that the second fetch request is targeting and in response to determining that servicing the second fetch request cannot be resolved locally, the first cache controller retires and ceases to protect the cache line.

At block 412, the first cache controller (e.g., a first one of the hardware controllers 350) copies metadata to the second cache controller (e.g., a second one of the hardware controllers 350). The metadata can be any data stored in the first cache controller.

Additional processes also may be included, and it should be understood that the processes depicted in FIG. 4 represent illustrations, and that other processes may be added or existing processes may be removed, modified, or rearranged without departing from the scope of the present disclosure. It should also be understood that the processes depicted in FIG. 4 may be implemented as programmatic instructions stored on a non-transitory computer-readable storage medium that, when executed by a processor (e.g., the processor set 110, the processing circuitry 120) of a computing system (e.g., the computer 101), cause the processor to perform the processes described herein.

Although one or more embodiments are described herein as applying to computing environments that are based on IBM's z/architecture, it should be appreciated that the embodiments described herein are not so limited to and may be applied to computing environments of other architectures also.

While the foregoing is directed to embodiments of the present disclosure, other and further embodiments of the present disclosure may be devised without departing from the basic scope thereof, and the scope thereof is determined by the claims that follow.

What is claimed is:

1. A computer-implemented method for cache governance comprising:
    receiving, at a local cache of a processor chip, a first fetch request from a local requestor for data for a cache line of the local cache;
    allocating a first cache controller to allow the first fetch request to receive the data for the cache line and to track reception of the data for the cache line;
    receiving, at the local cache of the processor chip, a second fetch request for the data for the cache line of the local cache;
    in response to receiving the second fetch request and in response to the first cache controller being in a state of sufficient authority to return a copy of the cache line to the local requestor, determining via an address compare logic associated with the local cache whether the first fetch request in the first cache controller is for a same cache line that the second fetch request is targeting;
    in response to determining that the first fetch request in the first cache controller is for the same cache line that the second fetch request is targeting and in response to determining that servicing the second fetch request cannot be resolved locally, allowing the second fetch request to allocate a second cache controller; and
    copying metadata from the first cache controller to the second cache controller.

2. The computer-implemented method of claim 1, wherein the first fetch request is a read-only request.

3. The computer-implemented method of claim 1, wherein the second fetch request is an exclusive fetch request.

4. The computer-implemented method of claim 1, wherein the cache governance provides hotline fairness.

5. The computer-implemented method of claim 1, wherein, as part of allowing the second fetch request to allocate the second cache controller, the address compare logic:
    generates a copy of hotline fairness vectors from the first cache controller; and
    stores the copy in the second cache controller.

6. The computer-implemented method of claim 1, wherein the second cache controller sets pending and protects the cache line, and wherein, in response to determining that the first fetch request in the first cache controller is for a same cache line that the second fetch request is targeting and in response to determining that servicing the second fetch request cannot be resolved locally, the first cache controller retires and ceases to protect the cache line.

7. The computer-implemented method of claim 1, wherein the second fetch request is sent from one or more other components selected from a group consisting of a processor core of the processor chip, an accelerator, and an input/output device.

8. The computer-implemented method of claim 1, wherein the first fetch request is sent from a first core of the processor chip, and the second fetch request is sent from a second core of the processor chip.

9. The computer-implemented method of claim 1, wherein the first cache controller provides read only access of the cache line to the local requestor.

10. A processor chip comprising:
    a bus; and
    a cache connected to the bus, the cache comprising a local cache and cache governance logic governs external access to the local cache from one or more other components connected to the bus, wherein the cache governance logic performs operations comprising:
        receiving, at the local cache of the processor chip, a first fetch request from a local requestor for data for a cache line of the local cache, the local requestor being one of the one or more other components connected to the bus;

allocating a first cache controller to allow the first fetch request to receive the data for the cache line and to track reception of the data for the cache line;

receiving, at the local cache of the processor chip, a second fetch request for the data for the cache line of the local cache;

in response to receiving the second fetch request and in response to the first cache controller being in a state of sufficient authority to return a copy of the cache line to the local requestor, determining via an address compare logic associated with the local cache whether the first fetch request in the first cache controller is for a same cache line that the second fetch request is targeting;

in response to determining that the first fetch request in the first cache controller is for the same cache line that the second fetch request is targeting and in response to determining that servicing the second fetch request cannot be resolved locally, allowing the second fetch request to allocate a second cache controller; and copying metadata from the first cache controller to the second cache controller.

11. The processor chip of claim 10, wherein the first fetch request is a read-only request.

12. The processor chip of claim 10, wherein the second fetch request is an exclusive fetch request.

13. The processor chip of claim 10, wherein the cache governance provides hotline fairness.

14. The processor chip of claim 10, wherein, as part of allowing the second fetch request to allocate the second cache controller, the address compare logic:

generates a copy of hotline fairness vectors from the first cache controller; and stores the copy in the second cache controller.

15. The processor chip of claim 10, wherein the second cache controller sets pending and protects the cache line, and wherein, in response to determining that the first fetch request in the first cache controller is for a same cache line that the second fetch request is targeting and in response to determining that servicing the second fetch request cannot be resolved locally, the first cache controller retires and ceases to protect the cache line.

16. The processor chip of claim 10, wherein the second fetch request is sent from one or more other components selected from a group consisting of a processor core of the processor chip, an accelerator, and an input/output device.

17. The processor chip of claim 10, wherein the first fetch request is sent from a first core of the processor chip, and the second fetch request is sent from a second core of the processor chip.

18. The processor chip of claim 10, wherein the first cache controller provides read only access of the cache line to the local requestor.

19. A system comprising:

a bus;

a cache connected to the bus, the cache comprising a local cache;

a memory comprising computer readable instructions; and a processing device for executing the computer readable instructions, the computer readable instructions controlling the processing device to perform operations for governing external access to the local cache from one or more other components connected to the bus, the operations comprising:

receiving, at the local cache, a first fetch request from a local requestor for data for a cache line of the local cache, the local requestor being one of the one or more other components connected to the bus;

allocating a first cache controller to allow the first fetch request to receive the data for the cache line and to track reception of the data for the cache line;

receiving, at the local cache, a second fetch request for the data for the cache line of the local cache;

in response to receiving the second fetch request and in response to the first cache controller being in a state of sufficient authority to return a copy of the cache line to the local requestor, determining via an address compare logic associated with the local cache whether the first fetch request in the first cache controller is for a same cache line that the second fetch request is targeting;

in response to determining that the first fetch request in the first cache controller is for the same cache line that the second fetch request is targeting and in response to determining that servicing the second fetch request cannot be resolved locally, allowing the second fetch request to allocate a second cache controller; and copying metadata from the first cache controller to the second cache controller.

20. The system of claim 19, wherein the first fetch request is a read-only request and the second fetch request is an exclusive fetch request.

* * * * *